United States Patent
Que et al.

(10) Patent No.: US 8,882,332 B2
(45) Date of Patent: Nov. 11, 2014

(54) LIGHT SOURCE MODULE, LED RECEIVER AND BACKLIGHT DEVICE

(75) Inventors: Chengwen Que, Shenzhen (CN); Yi-Cheng Kuo, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 484 days.

(21) Appl. No.: 13/264,970

(22) PCT Filed: May 19, 2011

(86) PCT No.: PCT/CN2011/074364
§ 371 (c)(1),
(2), (4) Date: Oct. 17, 2011

(87) PCT Pub. No.: WO2012/113182
PCT Pub. Date: Aug. 30, 2012

(65) Prior Publication Data
US 2012/0218777 A1 Aug. 30, 2012

(30) Foreign Application Priority Data
Feb. 24, 2011 (CN) .......................... 2011 1 0044967

(51) Int. Cl.
*F21V 29/00* (2006.01)
*F21V 19/00* (2006.01)
*F21V 19/04* (2006.01)
*F21V 8/00* (2006.01)
*F21Y 105/00* (2006.01)
*F21S 2/00* (2006.01)
*F21Y 101/02* (2006.01)

(52) U.S. Cl.
CPC ............ *F21V 19/004* (2013.01); *G02B 6/0073* (2013.01); *F21Y 2105/001* (2013.01); *F21V 29/004* (2013.01); *F21S 2/005* (2013.01); *F21Y 2101/02* (2013.01); *G02B 6/009* (2013.01); *F21V 29/225* (2013.01); *F21V 19/045* (2013.01)

USPC .................. 362/640; 362/249.02; 362/217.13

(58) Field of Classification Search
USPC ................................ 362/640, 249.02, 217.13
See application file for complete search history.

(56) References Cited

U.S. PATENT DOCUMENTS

| 2007/0098334 A1 | 5/2007 | Chen |
| 2008/0259551 A1* | 10/2008 | Gavenda et al. ............... 361/684 |
| 2009/0073693 A1* | 3/2009 | Nall et al. ................. 362/249.02 |
| 2009/0163241 A1* | 6/2009 | Vossoughi et al. ......... 455/556.1 |
| 2012/0008315 A1* | 1/2012 | Simon et al. ............. 362/217.13 |

FOREIGN PATENT DOCUMENTS

| CN | 1696796 A | 11/2005 |
| CN | 201043726 Y | 4/2008 |
| CN | 201129676 Y | 10/2008 |
| CN | 101551092 A | 10/2009 |
| CN | 101587261 A | 11/2009 |
| CN | 201593766 U | 9/2010 |
| CN | 201621525 U | 11/2010 |

* cited by examiner

*Primary Examiner* — Joseph L Williams
(74) *Attorney, Agent, or Firm* — Cheng-Ju Chiang

(57) ABSTRACT

A light source module is disclosed. The light source module comprises a light emitting diode (LED) and an LED receiver. The LED is provided with a locating element on a side surface thereof. The LED receiver has a receiving portion, and a snap-fitting structure is disposed on a side surface of the receiving portion to mate with the locating element so that the LED can be located in the receiving portion of the LED receiver. An LED receiver and a backlight device are also disclosed. The light source module and the LED receiver of the present invention allow for optimization of the assembling process of the LED.

16 Claims, 3 Drawing Sheets

LIGHT SOURCE MODULE, LED RECEIVER AND BACKLIGHT DEVICE

TECHNICAL FIELD

The present invention generally relates to the field of display technologies, and more particularly, to a light source module, a light emitting diode (LED) receiver and a backlight device comprising the light source module.

BACKGROUND

Owing to the rapid development of electronic product technologies, light emitting diodes (LEDs) are now used in more and more applications, for example, in the fields of LED lighting and liquid crystal displaying and in various industrial controlling apparatuses.

In the field of liquid crystal displaying, a liquid crystal display (LCD) usually comprises a backlight device and an LCD panel superposed on each other. The LCD panel cannot emit light by itself, so the backlight device is used as a light source in the liquid crystal dispalay for driving the liquid crystal display panel display images.. As a kind of typical point light source device, LEDs are often used in the backlight modules as a kind of key component. Usually, a plurality of LEDs used as point light source are arrayed on the surface of a printed circuit board (PCB) to form an LED light bar, and the LEDs are driven by the PCB to emit light to form a bar-shaped line light source. Then, by means of a light guide plate (LGP) of the backlight device, an exiting direction of the light is changed to obtain a uniform surface light source.

However, the backlight devices according to the prior art, the LEDs are usually soldered onto the PCBs through a soldering process. Consequently, the LEDs tend to be damaged due to the high temperature of the soldering process, and defects such as poor solder joints may be generated due to the process factors. Furthermore, maintenance of the light bar necessitates manual removal of the solder joints, which makes the maintenance process very complex, inefficient and time-consuming.

SUMMARY OF THE INVENTION

A primary objective of the present invention is to provide a light source module which can solve the problems of complexity in assembly and inconvenience in maintenance of the prior art LEDs.

To achieve this objective, the present invention provides a light source module, which comprises an LED and an LED receiver. The LED is provided with a locating element on a side surface thereof. The LED receiver has a receiving portion, and a snap-fitting structure is disposed on a side surface of the receiving portion to mate with the locating element. The LED is located in the receiving portion of the LED receiver.

According to a preferred embodiment of the present invention, the light source module further comprises a printed circuit board (PCB) having a conductive area. The LED is provided with a conductive portion on a bottom surface thereof. The PCB is joined with the LED receiver, and the conductive area is electrically connected to the conductive portion.

According to a preferred embodiment of the present invention, the PCB and the LED receiver are joined together through adhesion, soldering, riveting or screwing.

According to a preferred embodiment of the present invention, the conductive portion is an elastic piece having elasticity, and the conductive area is a bare copper area disposed on the PCB. An end of the elastic piece is electrically connected to an internal chip of the LED, and the other end of the elastic piece makes close and elastic contact with and is electrically connected to the bare copper area.

According to a preferred embodiment of the present invention, the locating element is an elastic element, and the snap-fitting structure is an assembling groove.

According to a preferred embodiment of the present invention, a stopping groove is further disposed in the assembling groove, and the elastic element comprises a slope portion adapted to slide into the assembling groove and a buckling portion adapted to mate with the stopping groove.

According to a preferred embodiment of the present invention, the stopping groove is a recess formed at the bottom of the assembling groove, a stopping surface is formed at an end of the stopping groove relative to the assembling groove, and the buckling portion of the elastic element abuts against the stopping surface.

According to a preferred embodiment of the present invention, the LED receiver is a heat dissipating support.

According to a preferred embodiment of the present invention, the heat dissipating support is provided with heat dissipating fins at a side opposite to the receiving portion.

To achieve the aforesaid objective, the present invention further provides an LED receiver for assembling an LED. The LED is provided with an elastic locating element on a side surface thereof, the LED receiver has a receiving portion, and the receiving portion is provided with a snap-fitting structure for mating with the elastic locating element. The LED is assembled to the LED receiver through mating of the elastic locating element with the snap-fitting structure.

To achieve the aforesaid objective, the present invention further provides a backlight device, which comprises a light guide plate and the light source module described above.

Embodiments of the present invention has the following benefits: as compared to the prior art, the light source module disclosed in embodiments of the present invention is provided with an LED receiver so that the LED can be elastically snap-fitted into the LED receiver and make elastic and close contact with the PCB. Because this eliminates the need of a soldering process, the problems caused by the soldering process in the prior art are obviated and the assembling process of the LED is optimized.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF EMBODIMENTS

Reference will now be made to the drawings to describe preferred and exemplary embodiments of the present invention in detail.

Figure 1:
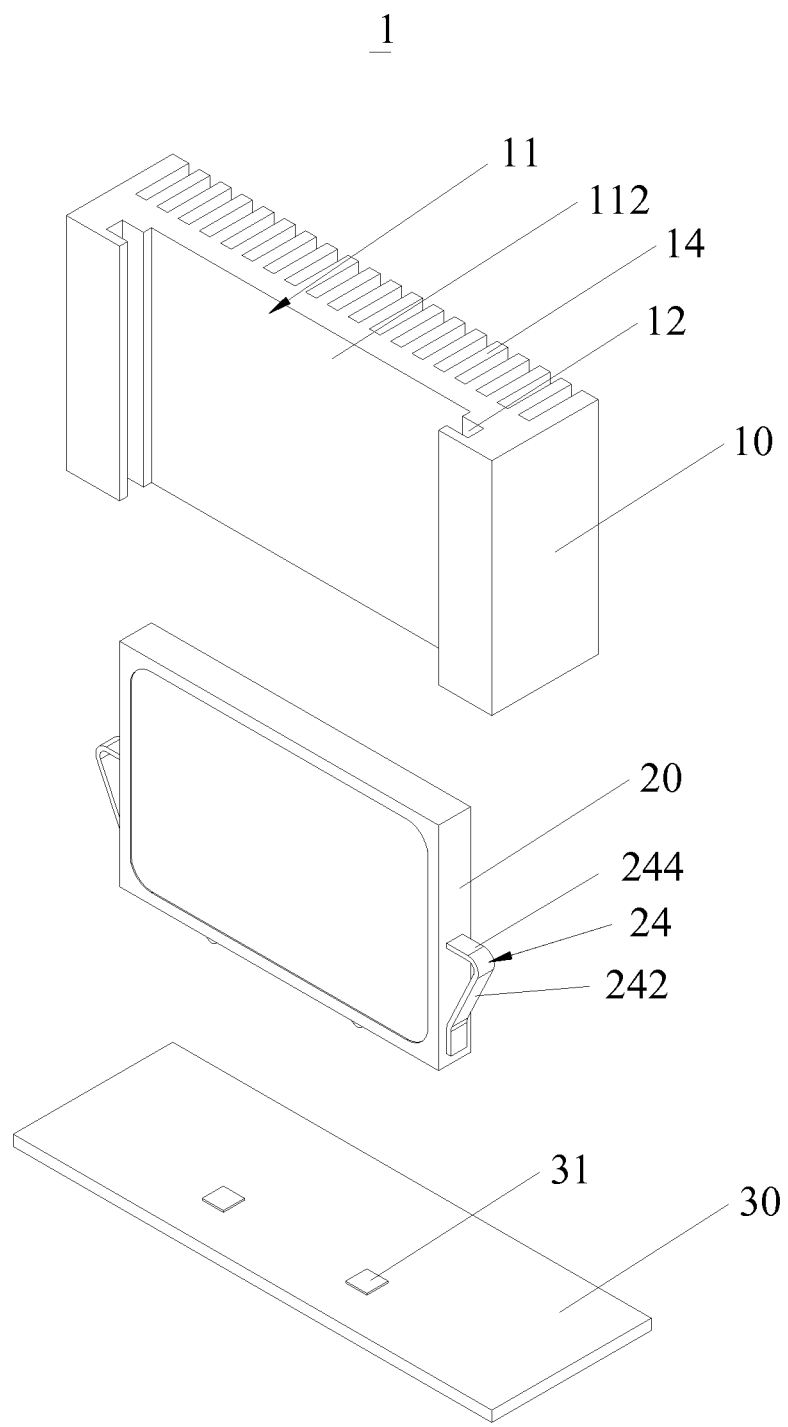
FIG. 1 is a schematic perspective exploded view of a light source module according to a preferred embodiment of the present invention.
Figure 2:
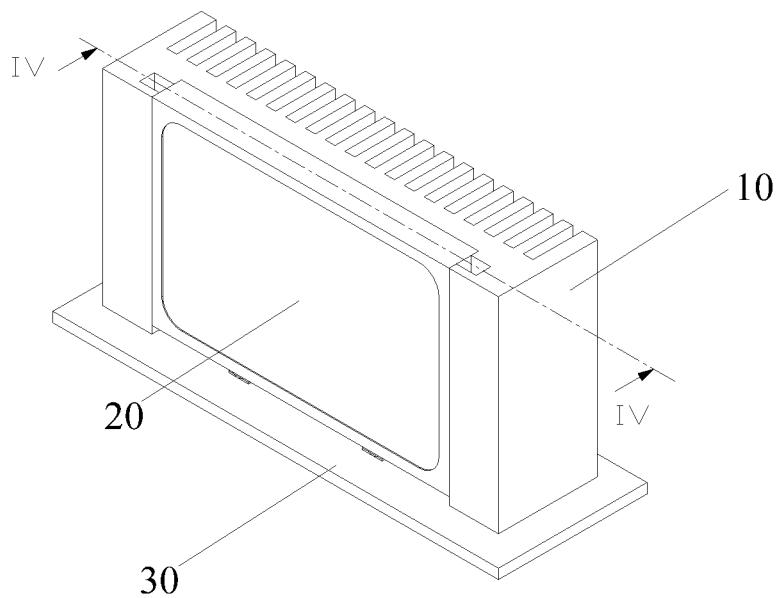
FIG. 2 is a schematic perspective view of the light source module shown in FIG. 1.
Figure 3:
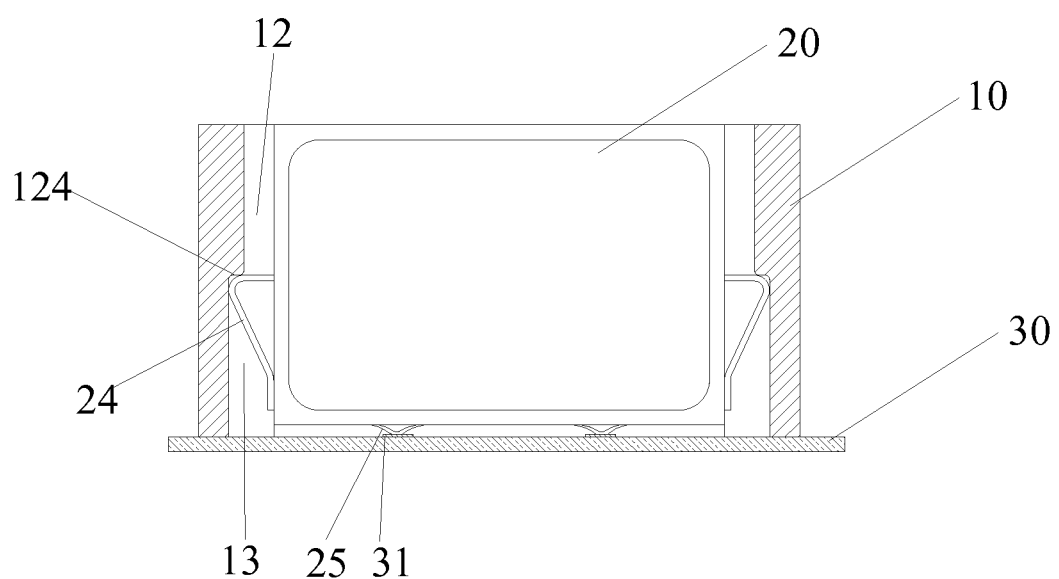
FIG. 3 is a cross-sectional view of the light source module of FIG. 2 taken along a line IV-IV.

Referring to FIGS. 1 to 3 together, an embodiment of the present invention provides a novel light source module 1, which comprises a light emitting diode (LED) receiver 10, an LED 20 and a printed circuit board (PCB) 30.

In this embodiment, the LED receiver 10 is used to assemble the LED 20, and is formed with a receiving portion 11 in the form of a recess. The receiving portion 11 is adapted to receive the LED 20, and is provided with snap-fitting structures on side surfaces thereof. The receiving portion 11 also has an opening 112 for light emitted by the LED 20 to be propagated outwards. In this embodiment of the present invention, each of the snap-fitting structures is an assembling groove 12, which is further formed with a stopping groove 13, as shown in FIG. 3. The stopping groove 13 is a recessed portion formed at the bottom of the assembling groove 12, and a stopping surface 124 is formed at an end (which is the upper end in this figure) of the stopping groove 13 relative to the assembling groove 12. The LED receiver 10 also serves as a heat dissipating support, and is provided with heat dissipating fins 14 at a side opposite to the receiving portion 11.

Figure 4:
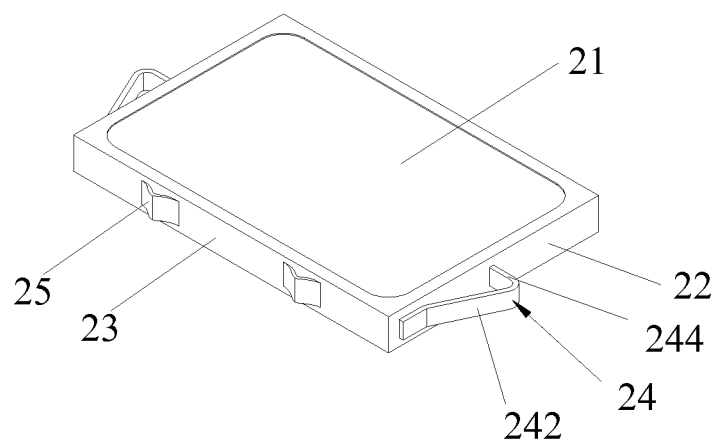
FIG. 4 is a schematic view illustrating a structure of the LED shown in FIG. 1.

Referring also to FIG. 4, the LED 20 is substantially of a cuboidal form, which comprises a light exiting surface 21, two side surfaces 22 and a bottom surface 23. The LED 20 is provided with locating elements on both side surfaces 22 thereof, and in this embodiment, each of the locating elements is an elastic element 24. The elastic element 24 comprises a slope portion 242 adapted to slide into the assembling groove 12 and a buckling portion 244 adapted to mate with the stopping groove 13. Specifically, in this embodiment, the buckling portion 244 abuts against the stopping surface 124 of the stopping groove 13 to locate the LED 20 into the LED receiver 10, and the light exiting surface 21 of the LED 20 is disposed in the opening 112 of the LED receiver 10. The elastic element 24 is used for snap-fitting with the LED receiver 10 and is not electrically conductive. The LED 20 is provided with conductive portions on the bottom surface 23 thereof, and in this embodiment, each of the conductive portions is an elastic piece 25 having elasticity. An end of the elastic piece 25 is electrically connected to an internal chip (not shown) of the LED 20, and the other end of the elastic piece 25 makes close and elastic contact with and is electrically connected to the PCB 30. It is worth noting that, the LED described herein is an LED package structure having elastic elements 24 and elastic pieces 25, and is simply called as an LED herein. Additionally, although the LED is described to be of a cuboidal structure in this embodiment, it will be readily appreciated by those skilled in the art that the aforesaid structure may also be applied to LEDs of other structures.

Referring back to FIGS. 1 to 3, the PCB 30 and the LED receiver 10 are joined together, which may be accomplished through adhesion, soldering, riveting or screwing in practice. The PCB 30 is provided with a conductive area. In this embodiment of the present invention, the conductive area is a bare copper area 31 disposed on the PCB, although it may also be made of other conductive materials but is not limited to copper. Alternatively, the conductive area may also be other conductive elements such as a conductive elastic piece soldered on the PCB 30. The elastic pieces 25 of the LED 20 make close and elastic contact with and are electrically connected to the bare copper area 31 on the PCB 30.

The present invention further provides an LED receiver. Referring to FIGS. 1 to 3 together, the LED receiver 10 is used to assemble the LED 20. The LED 20 is provided with elastic locating elements 24 on side surfaces thereof. The LED receiver 10 is provided with a receiving portion 11, which is further provided with snap-fitting structures on side surfaces thereof to mate with the elastic locating elements 24. In this embodiment, the snap-fitting structure is an assembling groove 12, which is further formed with a stopping groove 13. The LED 20 is assembled to the LED receiver 10 through mating of the elastic locating elements 24 with the assembling grooves 12.

The present invention further provides a backlight device, which comprises a light guide plate and the light source module 1 described above.

An embodiment of the present invention further provides a method for assembling a backlight module. As can be understood by those skilled in the art based on the above descriptions, the method for assembling a backlight module comprises the following steps:

firstly, the PCB 30 and the LED receiver 10 are joined together; and then, the LED 20 provided with the elastic locating elements 24 is inserted into the assembling grooves 12 of the LED receiver 10. When sliding into the assembling grooves 12, the elastic elements 24 experience compressive deformation and then slide into the stopping grooves 13 of the assembling grooves 12 to locate the LED 20 into the assembling grooves 12 of the LED receiver 10. Afterwards, the LED 20 is electrically connected to the PCB 30. Because the soldering process is eliminated, the LED 20 can be replaced by pressing the elastic locating elements 24 towards each other simply and conveniently.

In summary, as will be readily appreciated by those skilled in the art, the light source module of the present invention is provided with an LED receiver so that the LED can be elastically snap-fitted into the LED receiver and make elastic and close contact with the PCB. Because there is no need of a soldering process, the problems caused by the soldering process in the prior art are obviated and the assembling process of the LED is optimized.

It is worth noting that, although an LED receiver having a single receiving portion is described herein as an example to illustrate concepts of the present invention, a case where the LED receiver has a plurality of receiving portions will readily occur to those skilled in the art. In the latter case, a plurality of LEDs may be disposed inside the receiving portions to form a light bar, which is also simple to assemble and replace.

It shall be noted that, the terms "side surface", "bottom surface" and the like used to represent orientations in the embodiments of the present invention are all used in a relative sense in the context of particular conditions, and may also be changed depending on practical needs. For example, the term "bottom surface" used herein may also be replaced by "top surface", and this is not intended to limit the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A light source module, comprising:
   a light emitting diode (LED), being provided with a locating element on a side surface thereof; and
   an LED receiver, wherein the LED receiver has a receiving portion, a snap-fitting structure is disposed on a side surface of the receiving portion to mate with the locating element, and the LED is located in the receiving portion of the LED receiver;

wherein the locating element is an elastic element, the snap-fitting structure is an assembling groove, a stopping groove is further disposed in the assembling groove, a width of the stopping groove is larger than that of the assembling groove, and the elastic element comprises a slope portion adapted to slide into the assembling groove and a buckling portion adapted to mate with the stopping groove.

2. The light source module of claim 1, wherein the light source module further comprises a printed circuit board (PCB) having a conductive area, the LED is provided with a conductive portion on a bottom surface thereof, the PCB is joined with the LED receiver, and the conductive area is electrically connected to the conductive portion.

3. The light source module of claim 2, wherein the PCB and the LED receiver are joined together through adhesion, soldering, riveting or screwing.

4. The light source module of claim 2, wherein the conductive portion is an elastic piece having elasticity, the conductive area is a bare copper area disposed on the PCB, an end of the elastic piece is electrically connected to an internal chip of the LED, and the other end of the elastic piece makes close and elastic contact with and is electrically connected to the bare copper area.

5. The light source module of claim 1, wherein the stopping groove is a recess formed at the bottom of the assembling groove, a stopping surface is formed at an end of the stopping groove relative to the assembling groove, and the buckling portion of the elastic element abuts against the stopping surface.

6. The light source module of claim 1, wherein the LED receiver is a heat dissipating support.

7. The light source module of claim 6, wherein the heat dissipating support is provided with heat dissipating fins at a side opposite to the receiving portion.

8. An LED (light emitting diode) receiver for assembling an LED, the LED being provided with an elastic locating element on a side surface thereof, the elastic locating element comprises a slope portion and a buckling portion, wherein the LED receiver has a receiving portion, the receiving portion is provided with a snap-fitting structure for mating with the elastic locating element, and the LED is assembled to the LED receiver through mating of the elastic locating element with the snap-fitting structure;

wherein the snap-fitting structure is an assembling groove, a stopping groove is further disposed in the assembling groove, a width of the stopping groove is larger than that of the assembling groove, the slope portion of the elastic locating element is adapted to slide into the assembling groove, and the buckling portion is adapted to mate with the stopping groove.

9. The LED receiver of claim 8, wherein the LED receiver is a heat dissipating support.

10. The LED receiver of claim 9, wherein the heat dissipating support is provided with heat dissipating fins at a side opposite to the receiving portion.

11. A backlight device comprising a light guide plate and a light source module, wherein the light source module comprises:

an LED (light emitting diode), being provided with a locating element on a side surface thereof; and an LED receiver having a receiving portion, wherein a snap-fitting structure is disposed on a side surface of the receiving portion to mate with the locating element, and the LED is located in the receiving portion of the LED receiver;

wherein the locating element is an elastic element, the snap-fitting structure is an assembling groove, a stopping groove is further disposed in the assembling groove, a width of the stopping groove is larger than that of the assembling groove, and the elastic element comprises a slope portion adapted to slide into the assembling groove and a buckling portion adapted to mate with the stopping groove.

12. The backlight device of claim 11, wherein the backlight device further comprises a printed circuit board (PCB) having a conductive area, the LED is provided with a conductive portion on a bottom surface thereof, the PCB is joined with the LED receiver, and the conductive area is electrically connected to the conductive portion.

13. The backlight device of claim 12, wherein the conductive portion is an elastic piece having elasticity, the conductive area is a bare copper area disposed on the PCB, an end of the elastic piece is electrically connected to an internal chip of the LED, and the other end of the elastic piece makes close and elastic contact with and is electrically connected to the bare copper area.

14. The backlight device of claim 11, wherein the stopping groove is a recess formed at the bottom of the assembling groove, a stopping surface is formed at an end of the stopping groove relative to the assembling groove, and the buckling portion of the elastic element abuts against the stopping surface.

15. The backlight device of claim 11, wherein the LED receiver is a heat dissipating support.

16. The backlight device of claim 15, wherein the heat dissipating support is provided with heat dissipating fins at a side opposite to the receiving portion.

* * * * *